United States Patent
Rodgers

(10) Patent No.: US 7,764,174 B2
(45) Date of Patent: Jul. 27, 2010

(54) COLLECTABLE COP/SPOT CHIP

(76) Inventor: James Neil Rodgers, 8853 214th Place, Langley, BC (CA) V1M 2H9

( * ) Notice: Subject to any disclaimer, the term of this patent is extended or adjusted under 35 U.S.C. 154(b) by 237 days.

(21) Appl. No.: 11/752,062

(22) Filed: May 22, 2007

(65) Prior Publication Data
US 2008/0291020 A1 Nov. 27, 2008

(51) Int. Cl.
G08B 13/14 (2006.01)

(52) U.S. Cl. ............. 340/572.1; 340/572.9; 340/539.13

(58) Field of Classification Search ............. 340/572.1, 340/572.9, 539.13, 539.1, 572.8, 572.2, 572.7, 340/539.2, 539.32, 539.11, 825.49; 438/142
See application file for complete search history.

(56) References Cited

U.S. PATENT DOCUMENTS

| | | | |
|---|---|---|---|
| 5,497,140 A * | 3/1996 | Tuttle ................. | 340/10.1 |
| 7,019,640 B2 * | 3/2006 | Canich et al. ........... | 340/531 |
| 7,138,914 B2 * | 11/2006 | Culpepper et al. ..... | 340/539.13 |
| 7,388,492 B2 * | 6/2008 | Watanabe ............. | 340/572.1 |
| 7,466,232 B2 * | 12/2008 | Neuwirth ............... | 340/572.1 |
| 7,511,619 B2 * | 3/2009 | Allen .................... | 340/572.1 |

\* cited by examiner

Primary Examiner—Anh V La
(74) Attorney, Agent, or Firm—James Neil Rodgers

(57) ABSTRACT

A system and method for tracing the authenticity of and tracking their location of collectibles and reusables such as packaging and containers and pallets. This invention proposes the use, of a polymer or wet paper based planchette containing an RFID fully integrated system on a chip transponder which can be attached to a collectible or reusable through the use of a substrate friendly adhesive. As a collectable tracing and tracking system it is called "Collectable Cop". As a reusable on the supply chain which reusable(s) requires tracking or tracing, it is referred to as the "Spot Chip" system. A planchette is defined herein as a small, oval or round shaped, wet paper or polymer based disk, smaller than a piece of dust, which can be randomly distributed on both sides of a collectible.

11 Claims, 2 Drawing Sheets

---

COLLECTIBLE COP/SPOT CHIP

1. Large round object is a Collectible Baseball: a proxy for a Collectible or reusable
2. Small Spots on Collectible Baseball are Planchettes with inexpensive, dust sized, passive, system on a chip RFID transponders ( Spot Chips)embedded in them by a lamination or fiber weaving process.
3. Planchettes are round polymer or wet paper based discs that can be attached with substrate friendly adhesive to a Collectible or reusable.
4. Transponders manufactured from silicon wafers, laser ablation treated for increased radio active sensitivity to electromagnetic signals.
5. Antennas are of same laser ablation treated material and are integral part of transponder.
6. Antennas precisely tuned to specific frequency for ease of tracking and authentication of Collectibles or Reuseables.

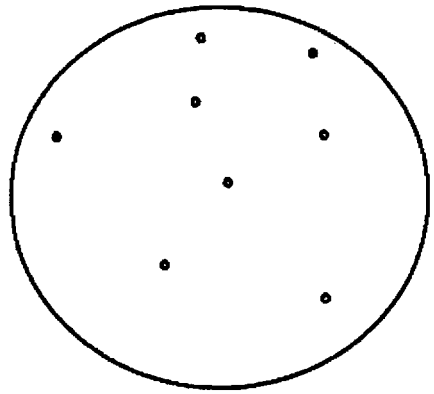

FIGURE 1: COLLECTIBLE COP/SPOT CHIP
1. Large round object is a Collectible Baseball: a proxy for a Collectible or reusable
2. Small Spots on Collectible Baseball are Planchettes with Inexpensive, dust sized, passive, system on a chip RFID transponders ( Spot Chips)embedded in them by a lamination or fiber weaving process.
3. Planchettes are round polymer or wet paper based discs that can be attached with substrate friendly adhesive to a Collectible or reusable.
4. Transponders manufactured from silicon wafers, laser ablation treated for increased radio active sensitivity to electromagnetic signals.
5. Antennas are of same laser ablation treated material and are integral part of transponder.
6. Antennas precisely tuned to specific frequency for ease of tracking and authentication of Collectibles or Reuseables.

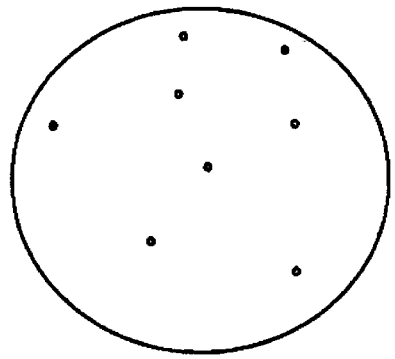

FIGURE 2 : COLLECTIBLE COP-SPOT CHIP : Tracking and Authentication

1. Arrows, double headed, show radio frequency signals. Cell Phone Tower ( Black triangle below) sends signal, for purpose of tracking, and activates transponders embedded in planchettes which planchettes are attached to a Collectible or Reuseable . Silicon antennas of transponders are precisely tuned to specific frequency for ease of tracking and authentication.
2. The transponder embedded planchettes are illustrated by the Spots ( Spot Chip) on the Collectibles or reuseables .
3. The multiple transponders once activated reply providing unique identification .Each of transponders on a collectible and or reuseable are mirror image duplicates in terms of Identity.
4. The multiple transponders on each collectible or reusable facilitate easier, more accurate identification of item.
5. RFID handheld reader (Black rectangle on left ) authenticates Collectible or reusable by read of unique transponder identification and checks against specific authorized database to validate as authentic.

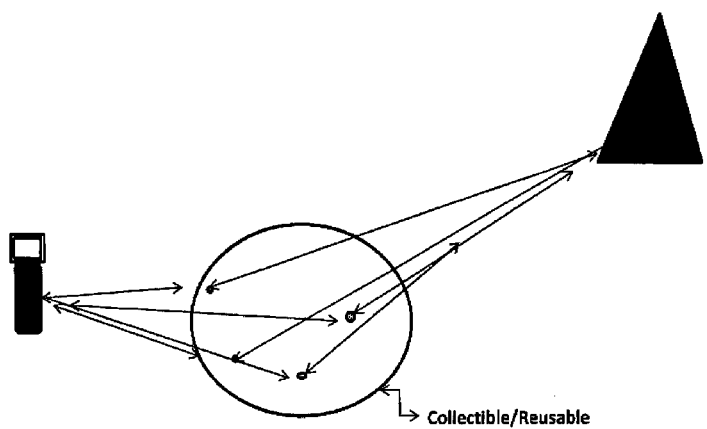

COLLECTABLE COP/SPOT CHIP

CROSS REFERENCE TO RELATED APPLICATIONS

Application Ser. No. 11/683,056 RFID Silicon Antenna by James Neil Rodgers

Application Ser. No. 11/689,316 RFID Tracking of Chose in Action by James Neil Rodgers Application Ser. No. 11/686,946 Precisely Tuned RFID Antenna by James Neil Rodgers Application Ser. No. 11/624,215 Stolen Bicycle (missing chattel) identification, tracking and location; a system and method by James Neil Rodgers All of the above of which are incorporated by reference in the present Application

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY REFERENCE OF MATERIAL SUBMITTED ON A COMPACT DISC

Not Applicable

FIELD OF THE INVENTION

The field of the invention is Radio Frequency Identification (RFID) and in particular relates to a system and method for tracing the authenticity of collectables and tracking both their location and the location of reusables such as packaging, containers pallets or any non consumable item utilized in the supply chain.

BACKGROUND OF THE INVENTION

There is a requirement in the sports industry for tracking its collectibles and memorabilia. The business of professional sports is estimated to be US$213 billion with the global market estimated to be a trillion dollars. The passion for professional sports has been labeled as "sporno", a new societal obsession. This is the idea that sport and athletes are the new type of pornography. As a function of this obsession, the sports collectibles market has grown with this increased focus on professional sports and sports stars. The sport collectibles market is a significant portion of the annual $10 billion retail collectibles market in the U.S. The market serves approximately 50 million collectors in the United States. In the past sport memorabilia was purchased mostly at large trade shows or on a private sale basis. Today this sports memorabilia market is a part of mainstream online and retail venues.

The challenge with the sports memorabilia market, according to FBI statistics, is that at least 70% of all autographed sports memorabilia is fraudulent and an estimated one half billion dollars is lost annually to fake sports collectibles in the U.S. It is perhaps the largest caveat emptor market in the U.S. The field is ripe for counterfeit items due to the growing demand and limited supply of genuine collectibles.

The majority of counterfeit sports memorabilia distributed across the United States have been traced to a finite number of counterfeiters who have turned their trade into an art form in and of itself using the latest computing and printing technologies. These rogue operations supply a large volume of counterfeit memorabilia to large scale distributors of sports collectible. The distributors then pass this fake product to major retail outlets and other distributors. Ultimately the fake memorabilia is channeled to a variety of retail outlets and into the hands of unsuspecting collectors.

On top of this problem there is also a huge market in stolen collectibles and memorabilia. This has dampened the enthusiasm for what had been a rapidly growing pastime among rabid fans.

The FBI conducted an investigation of sports memorabilia fraud which has taken place since 1997. The investigation was dubbed Operation Bullpen. It involved the establishment of a fake company which traded in sports memorabilia. It helped identify forgers and dealers who were distributing fake items. The first phase of the probe led to 16 convictions in Southern California while the second phase resulted in an additional 40 arrests.

In a like manner, the Federal Bureau of Investigation has instituted an Art Theft Program. The FBI website states that art and cultural property crime—which includes theft, fraud, looting, and trafficking across state and international lines—is a looming criminal enterprise with estimated losses running as high as $6 billion annually. The Art Crime Team ("ACT") of 12 Special Agents supported by three Special Trial Attorneys for prosecutions administers the National Stolen Art File. This is a computerized index of reported stolen art and cultural properties which are intended for the use of law enforcement agencies across the world. The FBI publishes a Top Ten Art Crimes list. Similarly, Interpol, the policing agency in Europe, publishes a list of Stolen Works of Art.

Stamp collections are another niche where huge rewards have been offered for return of stolen stamps. In one recent case $25 million was offered by an insurance company as a reward to any or all stamp dealers for providing information regarding specific items of philately which had been misappropriated.

Designer label clothing and accessories are the focus of major counterfeit entrepreneurs across the globe. However, there is a lack of legislation protecting the rights of fashion designers. Copyright laws for fashion designs do not exist as they do for artwork or trademark logos. Accordingly, the copying of design business is flourishing. For example, in Korea, during 2005, $162M of fake product was seized. China and Korea are the highest producers of fake goods. Among the $162M seized, the Chanel logo accounted for $23.5M. Other fashion lines seized were Rolex, Louis Vuitton and Nike. Those in the fashion industry attributed Chanel's leading position to its line of expensive handbags. Among different items, watches are the most vulnerable to replication with approximately $50.1M confiscated in 2005.

It is estimated that the fake goods market may reach $2 trillion by 2026. The Department of Commerce estimates the current counterfeit market in designer labels and accessories at $500 billion. Counterfeiting operations in countries like China and Brazil employ tens of thousands of people at manufacturing plants. They rival those of conglomerates like Sony. Their representatives visit trade shows where they acquire samples for the latest models to replicate. Sometimes the fakes are available in retail outlets before the genuine article.

SUMMARY OF INVENTION

This invention proposes the useful, non-obvious and novel steps of a polymer or wet paper based planchette containing an RFID fully integrated system on a chip transponder which can be attached to a collectible or reusable through the use of a substrate friendly adhesive. A collectible is defined herein as an individual piece of art work or an art collection, a stamp collection or an individual stamp, sports card collections or an individual card, sports memorabilia of any sort, currency collections or an individual piece of currency and items of a similar ilk including, but not limited to, designer label clothing, jewels and accessories. A reusable is defined as packaging, containers, pallets, totes or any other non consumable item utilized on the supply chain which reusable(s) requires tracking or tracing. A planchette is defined herein as a small, oval or round shaped, wet paper or polymer based disk, smaller than a piece of dust, which can be randomly distributed on both sides of a collectible. A planchette is a flat piece of material designed for a special purpose. In this circumstance the purpose is to remotely track or trace collectibles or reusables using the system and method of the RFID system described herein. This Invention incorporates by reference Rodgers application Ser. No. 11/683,056 titled "RFID silicon antenna" which contemplates an ablation technique for manufacturing a transponder antenna from silicon base materials which significantly decreases the size of said antenna and enables it to become an integral part of an IC chip; thereby obviating the need for a large, external antenna. This Invention also incorporates by reference Rodgers application Ser. No. 11/689,316 titled "RFID tracking of chose in action" which is a method of weaving or laminating an RFID silicon antenna, as part of a system on a chip, into a paper or polymer substrate. Incorporated by reference is Rodgers application Ser. No. 11/686,946 titled "Precisely tuned RFID antenna" which is a method and system of tuning the silicon antennas within a system on a chip to specific frequencies using nano laser techniques. This tuning is based on frequency increments of 2 MHz. Also incorporated by reference is Rodgers application Ser. No. 11/624,215 titled, "Stolen bicycle (missing chattel) identification, tracking and location; a system and method", which contemplates triangulation via cell towers to determine the physical location of embedded transponders.

The Inventor refers to this Invention as the "Spot Chip" in relationship to reusable(s) or as the "Collectible Cop" in relationship to collectable(s). Currently, the trade name "Spot Chip" and the trade name "Collectible Cop" are the subject of a U.S. Trade Name application by the Inventor.

BRIEF DESCRIPTION OF DRAWINGS

FIG. 1: Illustration of a proxy for a collectible with attached planchettes each with embedded dust sized system on a chip transponders.

FIG. 2: Illustration of tracking and authentication of system on chip transponders embedded in planchettes.

PRIOR ART

Prova Group in Texas is using RFID to authenticate sports memorabilia. The business model is to use RFID technology as an adjunct to being a third party authenticator of the genuineness of sports collectibles. The Prova system operates by attaching a tamper proof RFID tag directly on the surface of the collectible which is scheduled to be autographed by an athlete. At the moment of signing the Prova system records the exact time of the signature to the second. The autographer's secure identification code is written to the tag, recording who signed as well as when and where the signature occurred. The data is recorded in a fee for service back end registry administered by Prova. The business model of Prova is to precisely identify collectibles using RFID tags and then provide an online fee for service registry. Prova states that this model is an easy way to track a collectible's ownership history; in a way similar to a title search for a piece of fee simple property. The current Invention can be distinguished from the Prova system in that it allows the originator of the collectable, or anyone else, to place a planchette(s) upon the collectible which identifies its authentic nature and its whereabouts if stolen. There is no need for a third party authenticator for a fee but instead authentication is done directly through the website of the manufacturer or distributor. Tracking can be done using a triangulation method from a cellular telephone system.

Another company in Newport Beach, Calif., called Collectors Universe Inc. authenticates all types of items. Its sports division certifies more than 100,000 baseball cards and tens of thousands of signatures each month. This company charges a fee to authenticate items. This fee varies depending on the value of the item which is to be authenticated. This business model can be distinguished from the present Invention in that the present Invention uses RFID to determine authenticity and to track the whereabouts of stolen collectibles; however, the administration is the domain of the collector or the vendor of the collectible.

DETAILED DESCRIPTION

The purpose of the present Invention is to provide a system and method which enables the collectibles industry as well as the supply chain industry to solve the problems encountered with authenticity and theft. The challenges revolve around the inability of retailers to easily determine authenticity and the inability of owners to trace stolen collectibles. In the supply chain industry the same challenge surrounds the reusable items used in the chain such as packaging, crates or pallets. The resolution to this problem is the efficient use of RFID transponders and RFID interrogators in relationship to the collectibles or reusables. This is accomplished by applying specially manufactured planchettes to the collectibles or reusables using an adhesive which is friendly to the surface of the collectible or reusable.

The planchette is a tiny circular or oval, confetti like, disc of paper which can be lifted off the collectible leaving a round inkless space underneath. The planchettes are designed so they can be clipped off with a fingernail with the aid of a microscope. The planchettes can be randomly scattered across both sides of the collectible with commercially available laser printers. The planchettes are the size of a piece of dust. They can be manufactured to the hue or color required for camouflage as the circumstance of the collectible or reusable in question dictates. They glow blue under UV light, if required, and are uniform in shape, again circumstance dependent. The planchettes are made of fluorescent polymer (plastic) or as wet strength paper dots. The planchettes can be visible, invisible, and ultraviolet responsive or unresponsive.

An RFID transponder is embedded within the planchette as outlined in Rodgers application Ser. No. 11/689,316 titled "RFID tracking of chose in action". More specifically application Ser. No. 11/689,316 teaches a system to embed, using a laminate process, an RFID transponder into a polymer substrate; and teaches a system to embed, using a weaving fiber process, an RFID transponder into a paper substrate. Application Ser. No. 11/689,316, by extension to a commercial use for this Invention, teaches the function of using a silicon integrated circuit package, including fully housed antenna, for tracing and tracking collectibles/reusables and then a system for collecting and collating the received data into a centralized database. The embedded antenna removes the danger of damage to attached design antennas found in prior art.

Up until recently, the price of RFID tracking has not been financially feasible due to the high cost of the RFID tag. Primarily, the cost is in the metal material and labor unit cost which goes into the antenna which is externally attached to the silicon chip. Only the highest denomination of rare works of art would warrant the cost.

Tagged collectibles/reusables will require much better technology and design. For example, in 2003 Hitachi launched their "MU' chip which is only 0.4 millimeters square and 0.1 millimeters thick. This chip can allow the RFID tags to be read from a few millimeters away. This MU chip would allow retail outlets to verify collectibles without letting skimming technology spy on the contents of a customer's wallet. The challenge with the MU chip is embedding the hard silicon device into a collectible/reusable without doing damage to the collectible and thereby reducing its value. The chip must be accompanied by a flexible antenna, which may have to be inches long. This is not feasible for collectibles/reusables.

During February of 2007 Hitachi released an RFID chip which measures 0.05 millimeters by 0.05 millimeters. This is in contrast to their 2003 MU chip which was much larger. In fact, the current Hitachi chips are sixty times smaller than the MU chip. These new chips are the size of dust or powder and can be easily used in attached to a collectible/reusable by a planchette. The 2007 version Hitachi chip have a 128-bit ROM for storing a unique 38 digit number. Hitachi used miniaturization technology and electron beams to write data on the chip substrates. This is the breakthrough which allows the nano size of the Hitachi chips. The deficiency with this piece of prior art is that it requires an external antenna to communicate its data. On this basis, as a standalone, the Hitachi chip is deficient for attaching into collectibles/reusables. The external antenna would be large, unwieldy and totally unsuitable for collectibles/reusables.

This present Invention follows on and incorporates by reference two previous Rodgers' Applications which contribute, through better technology and design, to a significant decrease in the costs of RFID antennas and thus are an enabler to the widespread application of RFID to the traceability of collectibles/reusables. Furthermore, these two previous Applications significantly reduce the cost, weight and size of RFID antennas. There is application Ser. No. 11/683,056 titled, "RFID silicon antenna" which teaches a system of producing an RFID antenna using the silicon in an integrated circuit as the resonant antenna material for the purpose of reducing the cost of an RFID system and for the purpose of increasing the range and selectivity of the RFID system. According to this Rodgers Application the base silicon sheets which make up the primary building material of the silicon chip (integrated circuit) is subjected to a laser ablation process. This creates three dimensional nano structures on the surface of the silicon thereby raising its absorption rate of electromagnetic signals. On the reverse side of the same silicon sheet a directional antenna is etched using standard photographic reduction techniques and standard semi conductor industry manufacturing methods. The two sides of the silicon are connected through doping aluminum or copper impurities into these same base silicon sheets causing conductivity within the sheet of silicon.

Furthermore, there is Rodgers application Ser. No. 11/686,946 titled "Precisely tuned RFID antenna" which teaches an RFID antenna manufacturing system whereby the RFID antenna becomes an integral part of an integrated circuit system on a chip package. The RFID manufacturing system contemplated by this Application includes photoresist manufacturing techniques to produce a template or die specifically designed to mass produce RFID transponders whereby the chip and antenna becomes one integrated unit. The RFID antenna template or die is precisely tuned, using trimming algorithms and laser technology, to resonate with electromagnetic signal increments of 2 megahertz in the 24 to 40 GHz frequency range. According to this system each increment is assigned to a different category and therefore, in relationship to this present Invention, each increment could be assigned, as an example only, to a different stamp in a large collection. This present Invention reduces the cost, size and weight of prior art RFID transponders. The key inventive step in these two Rodgers' Applications as they apply to the present Invention is that the antenna of the RFID transponder is part and parcel of the chip and the same size as the chip. It is not external as all antennas are required to be as stipulated in the previous and prior art. This reduces size, weight and cost. Furthermore, each antenna can be precisely tuned to a specific frequency for each category or individual item of collectible within the 24 to 40 GHz frequency range.

This present Invention teaches a method of manufacture of planchettes as described in Rodgers Application Rodgers application Ser. No. 11/689,316 titled "RFID tracking of chose in action". That Application describes a process whereby polymer banknotes were developed by the Reserve Bank of Australia and were first issued as currency in 1988. They were made from the polymer biaxially-oriented polypropylene. This substrate enhances the durability of the banknotes. An alternative developed by DuPont is known as Tyvek. It is made of a polymer of polyethylene fibers. This was adopted for use by the American Bank Note Company. Polymer banknotes incorporate many security features not available to paper banknotes. Polymer allows for security features such as a transparent window and diffraction grating. The transparent window houses the Optically Variable Device (OVD), created from diffraction gratings in plastic, as a key security feature of the polymer banknote. The OVD is easily identifiable and allows anyone to authenticate a banknote. The polymer process is easily adaptable to the present Invention as the patented formula dictates a process of lamination in order to combine materials. In other words, more than one layer is applied to the polymer banknote. This is a process analogous to the layers of silicon added to a silicon wafer during the integrated circuit manufacturing process. Accordingly, it is contemplated by this Invention that it would be a simple manufacturing process to add the nano RFID integrated circuit system on a chip package between layers of ink on a planchette as they were printed.

There is also the traditional paper based manufacturing procedure described in application Ser. No. 11/689,316. The American Banknote Company embeds fibers, visible and invisible, into its products during the paper manufacturing process. Therefore, it is contemplated by this Invention that it would be a simple process to embed the integrated circuit system on a chip package contemplated herein with the fiber embedding procedure used by The American Banknote Company into a wet paper planchette.

Rodgers application Ser. No. 11/624,215 titled, "Stolen bicycle (missing chattel) identification, tracking and location; a system and method", teaches triangulation via cell towers to determine the physical location of embedded transponders. It is contemplated by this Invention that it would be a simple process to track collectibles using this method and system as follows: A memory based passive transponder is attached to each collectible and associated to a plurality of cellular telephone transmission towers through electromagnetic signals. This Invention contemplates cellular telephone network cooperation whereby the transmission can be sent in GHz with permission of the local cellular telephone network in order to triangulate the position of a stolen collectible.

The useful, non-obvious and novel step of this invention is to attach an integrated circuit package, comprised of a precisely tuned nano silicon RFID transponder chip and antenna, known as a system on a chip, into selected planchettes, using a lamination or fiber weaving process, for the purpose of tracing or tracking stolen collectibles/reusables by adhering the planchette to the collectibles/reusables using substrate friendly adhesive. Furthermore, this same planchette(s) can be used to transmit a unique identifier number for the purposes of authenticating the collectible/reusable.

DESCRIPTION OF THE PREFERRED EMBODIMENTS

One embodiment is in the baseball collectibles market. For example, collector's baseball cards could be splattered with planchettes, at precise locations, at the time of manufacture. These planchettes would be invisible to the naked eye and entirely camouflaged. They would be attached with collectable friendly adhesive. Each card would have planchettes attached giving each card a unique electromagnetic identifier number. The written format unique identifier number for each collectable card would be contained on the inside of a paper wrapper issued with each baseball card. The manufacturer would record the identifier number and place this number on its website. The collector could remove the wrapper from the baseball card after purchase and record the unique electromagnetic identifier number in a physical location separate from the collectible baseball card. If stolen, the collector could call the local cellular telephone network. The local cellular telephone network would have an agreement with manufacturers, as an add on service, to triangulate the location of a stolen collectable card within their jurisdiction. This could be expanded by reciprocal agreements among local cellular telephone networks to honor the agreements of each others' customers. Concurrently, a purchaser of the collectable baseball card from a retailer can check the authenticity of the collectable by reading the electromagnetic identifier on the planchettes with a hand held reader, designed for collectors, and then checking this electromagnetic identifier against the manufacturer's website. If the collector did not wish to have the Collectible Cop feature on any particular collectible, he could pick off the planchettes after getting the precise location from the manufacturer. The precise location information would be forthcoming only upon presentation of the unique identifier number on the collectable baseball card.

As an alternative embodiment, the planchettes could be added to the paper mixture of the paper substrate for the collectable baseball card. In this fashion, the planchettes would be permanent.

A second embodiment is in the rare art market. For example, rare art could be splattered with planchettes, at precise locations, at the time of sale by an art dealer. These planchettes would be invisible to the naked eye and entirely camouflaged into the piece of art. They would be attached with collectable friendly adhesive. Each planchette would have a unique electromagnetic identifier number. The written format unique identifier number for each piece of art would be contained on the bill of sale. The art dealer would record the unique electromagnetic identifier number and place this number on its website. The art collector would record the unique electromagnetic identifier number obtained from the bill of sale in a physical location separate from the art. If stolen, the art collector could call the local cellular telephone network. The local cellular telephone network would have an agreement with art dealers, as an add on service, to triangulate the location of a stolen piece of art within their jurisdiction. This could be expanded by reciprocal agreements among local cellular telephone networks to honor the agreements of each others' customers. Concurrently, a purchaser of the artwork from another collector can check the authenticity of the art by reading the electromagnetic identifier on the planchettes with a hand held reader, designed for art collectors, and then checking this electromagnetic identifier against the art dealer's website. If the collector did not wish to have the Collectible Cop feature on any particular piece of art, he could pick off the planchettes with the aid of a microscope or magnifying glass after getting the precise location from the manufacturer. The precise location information would be forthcoming only upon presentation of the unique identifier number on the piece of art. The planchettes can be removed without blemish to the original work of art. As an alternative embodiment, the planchettes could be added to the paper mixture of the paper substrate for the artwork. In this fashion, the planchettes would be permanent for new pieces of artwork.

Another embodiment is in the field of philately. For example, a rare stamp collection could be splattered with planchettes, at precise locations, at the time of sale by a philatelist shop. These planchettes would be invisible to the naked eye and entirely camouflaged into the individual stamp. They would be attached with collectable friendly adhesive. Each set of planchettes for each individual stamp would have a unique electromagnetic identifier number. The written format unique identifier number for each stamp would be contained on the bill of sale. The philatelist shop would record the unique electromagnetic identifier number and place this number on its website. The philatelist would record the unique electromagnetic identifier number obtained from the bill of sale in a physical location separate from the stamp collection. If stolen, the stamp collection owner could call the local cellular telephone network. The local cellular telephone network would have an agreement with philatelists, as an add on service, to triangulate the location of a stolen stamps within their jurisdiction. This could be expanded by reciprocal agreements among local cellular telephone networks to honor the agreements of each others' customers. Concurrently, a purchaser of the stamps from another stamp collector can check the authenticity of the stamps by interrogating the electromagnetic identifier on the planchettes with a hand held reader, designed for stamp collectors, and then checking this electromagnetic identifier against the website of the philatelist shop. If the collector did not wish to have the Collectible Cop feature on any particular stamp, he could pick off the planchettes using a microscope or magnifying glass after getting the precise location from the manufacturer. The precise location information would be forthcoming only upon presentation of the unique identifier number on the stamp. The planchettes can be removed without blemish to the original stamps.

As an alternative embodiment, the planchettes could be added to the paper mixture of the paper substrate for the stamps. In this fashion, the planchettes would be permanent for new stamp issues.

A fourth embodiment is in the designer label accessories. For example, a Chanel handbag shipment could be splattered with planchettes, at precise locations, at the time of shipment by the genuine manufacturer. These planchettes would be invisible to the naked eye and entirely camouflaged into the individual handbag. They would be attached with handbag friendly adhesive. Each set of planchettes for each individual handbag would have a unique electromagnetic identifier number. The written format unique identifier number for each handbag would be contained on the bill of sale. The manufacturer would record the unique electromagnetic identifier number and place this number on its website. The purchaser would record the unique electromagnetic identifier number obtained from the bill of sale in a physical location separate from the handbag. If stolen, the handbag owner could call the local cellular telephone network. The local cellular telephone network would have an agreement with the manufacturer, as an add on service, to triangulate the location of a stolen handbags within their jurisdiction. This could be expanded by reciprocal agreements among local cellular telephone networks to honor the agreements of each others' customers. Concurrently, a purchaser of the handbag from another owner can check the authenticity of the handbag by interrogating the electromagnetic identifier on the planchettes with a hand held reader, designed for such use and available commercially, and then checking this electromagnetic identifier against the website of the manufacturer. If the owner did not wish to have the Collectible Cop feature on any particular handbag, she could pick off the planchettes with the aid of a microscope or magnifying glass after getting the precise location from the manufacturer. The precise location information would be forthcoming only upon presentation of the unique identifier number on the handbag. The planchettes can be removed without blemish to the materials of the original handbag A fifth embodiment is to use the planchettes on any non consumable item used in a supply chain. These could consist of packaging materials, pallets, containers, totes, or any other non consumable used on the supply chain. The use of the tracing and tracking with planchettes would be as described above.

All embodiments herein are used as examples only and do not represent limitations to the Claims of this Invention.

I claim:

1. A system for tracing the authenticity and tracking the location of collectibles and reusables comprising: collectable (s), defined herein as an individual piece of art work or an art collection, a stamp collection or an individual stamp, a sports card collection or an individual card, sports memorabilia of any sort, currency collections or an individual piece of currency as well as items of a similar ilk including, but not limited to, designer label clothing, jewels and accessories, said system with respect to collectibles herein referred to as the Collectible's Cop; reusable(s) defined as packaging, containers, pallets or any other non consumable item utilized on the supply chain which reusable(s) requires tracking or tracing, said system with respect to reusables herein referred to as the Spot Chip; passive memory based transponder(s) associated with and attached to each collectible and/or reusable; planchettes; silicon antenna(s) as part of a system on a chip RFID transponder embedded into a planchette(s) and where the planchette is applied with adhesive friendly to the substrate of the collectable or reusable; a dust sized memory based passive transponder; a plurality of cellular telephone towers able to perform an operation by providing and/or receiving information bearing electromagnetic signals in a gigahertz frequency and where the information bearing electromagnetic signals in gigahertz frequency are in a detection region located within an urban cellular telephone network which have a plurality of antennae operatively coupled to a respective one of a plurality of memory based transponder readers for transmitting and/or receiving the information bearing electromagnetic signals; information stored in and produced from the electronic memory of the memory based RFID transponder that includes a permanent unique identification number plus application specific data and whereby said electromagnetic information is communicated between the electronic memory of the memory based RFID transponder and the memory based RFID transponder reader of a particular cellular telephone tower/station when the memory based RFID transponder is in the detection region of that particular station after initiation of the memory based RFID transponder; a computer processor for processing at least the information from the electromagnetic signals including application specific data and unique identification number obtained from the memory based RFID transponder readers at the plurality of stations and for providing a record of the data represented by the electromagnetic information signals gained from the memory based RFID transponder(s); hand held interrogators to harvest the data from the memory based RFID transponders, without beginning the initiation phase, for the purpose of determining authenticity.

2. The system of claim 1 wherein the data contained in the information bearing electromagnetic signals transmitted in gigahertz frequency is representative of one or more of the identity of the memory based RFID transponder, the identity of the missing collectable or reusable, a model number, a serial number, information of interest to the proprietor or operator of the cellular telephone network system or the customers, a type number, a name or nomenclature of the missing collectable or reusable, material and/or component information, and such information relating to the missing collectable or reusable, information relating to the location of the missing collectable or reusable and/or information relating to routing of the missing collectable or reusable, the identity of the cellular telephone tower/station(s) involved in the tracking or tracing, the operation performed at the tower/station(s), an operator associated with the tower/station(s), a distance measurement made at the tower/station(s), access information plus time and date information.

3. The system of claim 1 whereby the electromagnetic information contained in the gigahertz frequency format signal is communicated to and is stored in both the computer processor located at the tower/station(s) and in the electronic memory of the passive RFID transponder whereby said communication further comprises at least one communication hub for providing communication between one of: (a) a central processor and at least one local processors, and (b) ones of local processors.

4. The system of claim 1 wherein the information processed by the computer processor includes a permanent number, application specific data and a check number which represents the permanent number and/or application specific data assigned to the missing collectable or reusable and whereby the communication means comprises of one or more of a cellular telephone network or a satellite based communication network using radio or RF transmissions and the Internet, or a combination thereof.

5. The system of claim 1 whereby the passive RFID transponder, upon initiation and awakening through a gigahertz prompt and response electromagnetic signal from the local network cellular telephone tower/station(s) then backscatters an RF signal via gigahertz frequency communication to the nearest local cellular telephone tower/station(s) indicating that the passive RFID transponder has been awakened by providing the application specific data identifying itself via unique serial number assignment.

6. The system of claim 1 whereby further the radio frequency means for locating a missing collectable or reusable includes determining geographical positions by executing a direction-of-arrival technique (DOA) from the plurality of tower/station(s) transmitter/receiver(s) located at the local cellular telephone network tower/station(s) and then employing direction finding data and raw signal data in performing a time-difference-of-arrival (TDOA) technique to estimate the location of the missing collectable or reusable and the system of using an algorithm which is capable of separating and recovering multiple co-channel signals rapidly from each tower/station(s) transmitter/receiver(s) and to then perform a triangulation, trilateration, or time-difference-of-arrival (TDOA) routine to determine an estimated location of the missing collectable or reusable and the system of a signal estimation locator device containing the algorithm software described which resides at a master control unit or a master receiver located at a cell tower station.

7. A The system of claim 1 whereby said dust sized memory based system on the chip RFID transponder with silicon antenna is by way of a system of using a generic laser pulse device to treat commercially produced bulk sheets of silicon wafer base material with a pulse of sharply focused laser energy; and still further using the bulk commercially produced sheets of silicon wafers so that they are manufactured into radio frequency identification antennas after the femtosecond laser ablation technique has been applied all for the purpose of creating three dimensional nano structures on the silicon base material in order to increase radioactive sensitivity to electromagnetic signals for use in passive RFID transponders to be employed for tracing and tracking collectable(s) and reusable(s) system of and, still further again, designing a complex resonant antenna at a macro level and reducing it through the process of de-magnification to nano size and forming this structure on the reverse side of silicon wafers treated with laser ablation for the purpose of increasing the radioactive sensitivity of the RFID antenna and to increase the gain and range of same for use in passive RFID transponders to be employed for tracing and tracking collectable(s) and reusable(s).

8. The system of claim 1 whereby the RFID transponder integrated circuit system on a chip package further comprising: at least one substrate, each substrate including at least one silicon layer; at least one semiconductor template, also known as a die; an antenna constructed of doped silicon layered into said integrated circuit package using a photoresist manufacturing process; a system whereby an RFID transponder antenna is designed, photographed and de-magnified to produce a template or die; a system whereby the antenna template or die is designed to mass produce an RFID transponder antenna which is part of an integrated circuit package with a precise electromagnetic signal which resonates or tunes in the 24 to 40 GHz (gigahertz) range; a system whereby a laser methodology of trimming the antenna template or die to resonate or tune in 2 MHz (megahertz) increments from the 24 GHz (gigahertz) frequency to the 40 GHz (gigahertz) frequency is utilized; a system of algorithms whereby the antenna template or die is precisely trimmed to a specific resonant frequency; a system of testing the frequency resonance of the template or die through laser methodology to ensure a precise frequency resonance of the mass produced RFID transponders which are integrated into a single packaged integrated circuit; all for the purpose of reducing the size, weight and cost of a passive RFID transponder while increasing its efficiency by reducing the signal to noise ratio for use in the tracking and tracing of collectable(s) and reusable(s).

9. The system of claim 1 whereby further the nano size silicon integrated circuit system on a chip package is embedded onto a polymer substrate through the process of lamination of layers where at least one of the layers contains the nano size silicon integrated circuit system on a chip package and the nano size silicon integrated circuit system on a chip package is embedded into a wet paper strength substrate through the process of fiber weaving whereby the nano size silicon integrated circuit system on a chip package is woven directly into a wet paper strength substrate for the purpose of manufacturing a planchette to be attached to collectable(s) and reusable(s).

10. The system of claim 1 whereby further a substrate friendly adhesive glue, commercially available, specific to the use required is used for attaching a planchette to a collectable(s) or reusable(s), as required.

11. A system for tracing the authenticity and tracking the location of collectibles and reusables comprising: collectable(s), defined as an individual piece of art work or an art collection, a stamp collection or an individual stamp, a sports card collection or an individual card, sports memorabilia of any sort, currency collections or an individual piece of currency as well as items of a similar ilk including, but not limited to, designer label clothing, jewels and accessories, said system with respect to collectibles herein referred to as the Collectible's Cop; reusable(s) defined as packaging, containers, pallets or any other non consumable item utilized on the supply chain which reusable(s) requires tracking or tracing, herein referred to as the Spot Chip; passive memory based transponder(s) associated with and attached to each collectible and/or reusable; planchettes; silicon antenna(s) as part of a system on a chip RFID transponder embedded into a planchette(s) and where the planchette is applied with adhesive friendly to the substrate of the collectable or reusable; a dust sized memory based passive transponder; a plurality of cellular telephone towers able to perform an operation by providing and/or receiving information bearing electromagnetic signals in a gigahertz frequency and where the information bearing electromagnetic signals in gigahertz frequency are in a detection region located within an urban cellular telephone network which have a plurality of antennae operatively coupled to a respective one of a plurality of memory based transponder readers for transmitting and/or receiving the information bearing electromagnetic signals; information stored in and produced from the electronic memory of the memory based RFID transponder that includes a permanent unique identification number plus application specific data and whereby said electromagnetic information is communicated between the electronic memory of the memory based RFID transponder and the memory based RFID transponder reader of a particular cellular telephone tower/station when the memory based RFID transponder is in the detection region of that particular station after initiation of the memory based RFID transponder; a computer processor for processing at least the information from the electromagnetic signals including application specific data and unique identification number obtained from the memory based RFID transponder readers at the plurality of stations and for providing a record of the data represented by the electromagnetic information signals gained from the memory based RFID transponder(s); hand held interrogators to harvest the data from the memory based RFID transponders, without beginning the initiation phase, for the purpose of determining authenticity; and whereby further the antennas are tuned at 2 MHz intervals in the 24 to 40 GHz frequency range for the purpose of identifying individual or class items in the variety collectable(s) or reusable(s) as required by the system operator or proprietor.

* * * * *